United States Patent
Beyer et al.

(10) Patent No.: US 12,509,584 B2
(45) Date of Patent: Dec. 30, 2025

(54) SILICONE RUBBER COMPOSITIONS

(71) Applicants: DOW GLOBAL TECHNOLOGIES LLC, Midland, MI (US); DOW SILICONES CORPORATION, Midland, MI (US)

(72) Inventors: Patrick Beyer, Wiesbaden (DE); Michael Rosenzweig, Wiesbaden (DE); Michael Backer, Wiesbaden (DE); Cesare Benedetti, Terneuzen (NL); Matthew Jeletic, Midland, MI (US)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 645 days.

(21) Appl. No.: 18/012,182

(22) PCT Filed: Jun. 16, 2021

(86) PCT No.: PCT/US2021/037550
§ 371 (c)(1),
(2) Date: Dec. 21, 2022

(87) PCT Pub. No.: WO2021/262497
PCT Pub. Date: Dec. 30, 2021

(65) Prior Publication Data
US 2023/0323121 A1    Oct. 12, 2023

Related U.S. Application Data

(60) Provisional application No. 63/043,364, filed on Jun. 24, 2020.

(51) Int. Cl.
*C08L 83/04* (2006.01)
*C08J 7/04* (2020.01)
*C08J 7/18* (2006.01)

(52) U.S. Cl.
CPC ............. *C08L 83/04* (2013.01); *C08J 7/0427* (2020.01); *C08J 7/18* (2013.01); *C08J 2369/00* (2013.01); *C08J 2383/05* (2013.01); *C08L 2207/04* (2013.01)

(58) Field of Classification Search
None
See application file for complete search history.

(56) References Cited

U.S. PATENT DOCUMENTS

| | | |
|---|---|---|
| 3,419,593 A | 12/1968 | Willing |
| 3,445,420 A | 5/1969 | Kookootsedes et al. |
| 3,715,334 A | 2/1973 | Karstedt |
| 3,814,730 A | 6/1974 | Karstedt |
| 3,989,667 A | 11/1976 | Lee et al. |
| 4,533,575 A | 8/1985 | Melancon |
| 5,504,174 A | 4/1996 | Onishi |
| 6,605,734 B2 | 8/2003 | Roy et al. |
| 2005/0038217 A1 | 2/2005 | Ahn et al. |
| 2005/0089696 A1 | 4/2005 | Bosshammer |
| 2006/0276600 A1 | 12/2006 | Aketa et al. |
| 2007/0275255 A1 | 11/2007 | Ooms et al. |
| 2011/0178198 A1 | 7/2011 | Backer et al. |
| 2014/0179863 A1 | 6/2014 | Kato |
| 2019/0040204 A1 | 2/2019 | Beyer et al. |
| 2021/0054199 A1 | 2/2021 | Tasaki et al. |
| 2021/0222008 A1 | 7/2021 | Hara |
| 2022/0372304 A1 | 11/2022 | Fisher et al. |
| 2023/0092246 A1 | 3/2023 | Hornig et al. |

FOREIGN PATENT DOCUMENTS

| | | | |
|---|---|---|---|
| CN | 110408215 A | * 11/2019 | ............. C08G 77/20 |
| EP | 0545591 A1 | 6/1993 | |
| JP | 2007009189 A | 1/2007 | |
| JP | 2009109579 A | 5/2009 | |
| JP | 2009155442 A | 7/2009 | |
| WO | 2005012432 A1 | 2/2005 | |
| WO | 2018003511 A1 | 1/2018 | |
| WO | 2019061290 A1 | 4/2019 | |
| WO | 2019131081 A1 | 7/2019 | |

(Continued)

OTHER PUBLICATIONS

English translation of CN-110408215-A (Year: 2019).*
International Search Report for PCT/US2021/060443 dated Mar. 10, 2022, 4 pages.
Tatrishvili, "Hydrosilylation Reactions of Polymethylhydrosiloxane with Acrylates and Methacrylates and Solid Polymer Electrolyte Membranes on their Basis" 2015, vol. 38, No. 2, p. 776-788.
Machine-assisted translation of JP2009109579A obtained from https://patents.google.com/ on Feb. 13, 2024, 15 pages.

(Continued)

*Primary Examiner* — Randy P Gulakowski
*Assistant Examiner* — Audra J Destefano
(74) *Attorney, Agent, or Firm* — Warner Norcross + Judd LLP

(57) ABSTRACT

A curable silicone rubber composition of the type referred to in industry as "self-adhesive" or as having "selective adhesion" (hereafter referred to as "curable self-adhesive silicone rubber compositions"). The curable self-adhesive silicone rubber compositions comprise: (A) one or more organopolysiloxanes containing at least 2 alkenyl groups and/or alkynyl groups per molecule and having a viscosity in a range of 1000 mPa·s to 200,000 mPa·s at 25° C.; (B) an organopolysiloxane containing at least 2 or 3 silicon-bonded hydrogen atoms per molecule; (C) at least one hydrosilylation catalyst; (D) at least one reinforcing and optionally one or more non-reinforcing fillers; (E) an adhesion promoter; and (F) an oligomer which has been found to surprisingly provide heat-humidity stabilization.

15 Claims, No Drawings

(56) References Cited

FOREIGN PATENT DOCUMENTS

WO   2019232778 A1   12/2019

OTHER PUBLICATIONS

Machine-assisted translation of JP2009155442A obtained from https://patents.google.com/ on Feb. 13, 2024, 13 pages.
International Search Report for PCT/US2021/037550 dated Oct. 22, 2021, 3 pages.

* cited by examiner

SILICONE RUBBER COMPOSITIONS

CROSS-REFERENCE TO RELATED APPLICATIONS

This application is the U.S. National Stage of International Application No. PCT/US2021/037550 filed on 16 Jun. 2021, which claims priority to and all advantages of U.S. Provisional Patent Application No. 63/043,364 filed on 24 Jun. 2020, the content of which is incorporated herein by reference.

The present disclosure relates to curable silicone rubber compositions (alternatively referred to as curable silicone elastomer compositions) of the type referred to in industry as "self-adhesive" or as having "selective adhesion" (hereafter referred to as "curable self-adhesive silicone rubber compositions". The curable self-adhesive silicone rubber compositions described herein are provided with an oligomeric additive which provides heat-humidity stabilization. Elastomers made by curing the aforementioned compositions, composites comprising said elastomers and thermoplastic substrates, organic resin substrates or thermoplastic and organic resin substrates, as well as processes for adhering said compositions to the thermoplastic or organic resin-based substrates are also provided.

Curable silicone elastomer compositions cure to provide silicone elastomer materials (otherwise referred to as silicone rubbers). One suitable cure process is via an addition cure mechanism, otherwise described as a hydrosilylation process using a platinum group catalyst.

Curable self-adhesive silicone rubber compositions are curable silicone rubber compositions able to adhere during cure to substrates made from thermoplastic materials, organic resin based materials or both thermoplastic materials and organic resin based materials with which they are placed in direct contact prior to or during the cure process. However, said curable self-adhesive silicone rubber compositions remain non-adhesive towards metallic substrates such as molds during normal processing. It is for the latter reason that they may alternatively be referred to as having selective adhesion. The term "direct contact" is intended to be understood to mean that the adhesive properties of the curable self-adhesive silicone rubber compositions are such that no primers are required to be applied to the surface of the substrates made from thermoplastic materials, organic resin based materials or both thermoplastic materials and organic resin based materials in order to generate adhesion. By the time the silicone elastomer has cured on the substrate surface there is adhesion between the interfaces of the silicone elastomer and the organic substrate.

Silicone elastomers are used in a wide variety of applications including, for the sake of example, in electric and electronic, healthcare, kitchenware, and automotive applications not least because they have highly reliable properties with respect to heat resistance, weatherability and electrical insulation. In automotive connector seal applications, silicone rubber can provide reliable sealing performance compared with many plastics particularly in harsh environments. They provide reliable seals for the use of safe running of automotive electronic control systems, enhancing the safety and comfort experience for both drivers and passengers. Silicone seals and coatings are also important for the waterproofing and sealing of parts made from silicone rubber in smart phone and wearable devices. However, in certain applications their use has been limited due to their inability to form sufficiently strong adhesive bonds with plastic and thermoplastic substrates such as polycarbonates.

The application of primers onto the substrate surfaces was initially utilised to overcome this issue. However, several problems have arisen using methods requiring primers. Primer methods are cumbersome, not least because they can result in unreliable productivity, quality control issues and indeed reliability issues for parts/articles being made. The selection, storage, use and processing of primers can also greatly influence the adhesion level resulting in a need to take great care of them not least during storage before use. So, the use of primers needs to be well controlled in order to achieve good adhesion and such processes are often time consuming and may result in low productivity and seals of variable quality. There is therefore a desire to avoid the use of primers if possible and this has latterly been achieved by using self-adhesive silicone rubber materials which will have satisfactory adhesion without the need for primed surfaces.

For example, it may be desired for a silicone elastomer to be overmoulded onto other parts made of different or the same materials. For example, a silicone gasket can be moulded onto a thermoplastic housing, made from polyamide or polybutylene terephthalate. In another example a wearable electronic device can be obtained by overmoulding a hard thermoplastic such as polycarbonate with a soft layer or part made of liquid silicone rubber from a curable silicone elastomer composition. Further examples include airbag fabrics coated with a silicone elastomer. Organic substrates onto which self-adhesive silicone rubber compositions may be over-molded include, for the sake of example, polybutylene terephthalate (PBT), polyamide (PA) and polycarbonate (PC), while enabling good release from metal mold during injection molding.

In a further alternative proposal it has been suggested to incorporate liquid silicone rubber cross-linkers, e.g. organohydrogenpolysiloxanes in the polycarbonate substrate. However, such a process has been found to have a negative effect on the physical properties of the polycarbonate itself preventing the resin from exerting its own properties. The physical engagement method leaves a possibility that the two segments may be disengaged by physical forces.

The use of self-adhesive silicone rubbers/elastomers is a preferred alternative as it can give better productivity, quality control and reliability of the parts/articles at least partially due to the removal of the need to use the primer. Where a self-adhesive addition curing type silicone rubber composition is applied and cured to a plastic/thermoplastic/resin material preform, the adhesive bond formed between the two has regularly proven to be insufficient for use as a one-piece member when the plastic/thermoplastic/resin is a polycarbonate resin.

However, whilst self-adhesive silicone rubber can provide good initial adhesion on various substrates, it has been found that the durability of the adhesive bond under prolonged exposure to heat and humidity represents a challenge.

The durability of adhesion between the self-adhesive silicone material and the thermoplastic substrates, organic resin substrates or thermoplastic and organic resin substrates is of great importance for the use of the combination to be a success but the provision of composites with good aged (heat/humidity) adhesion on various substrates, remains a technical challenge.

The present disclosure relates to a self-adhesive curable silicone elastomer composition that can achieve adhesion on plastic/thermoplastic/resin material substrates, comprising:

(A) one or more organopolysiloxanes containing at least 2 alkenyl groups and/or alkynyl groups per molecule and having a viscosity in a range of 1000 mPa·s to 200,000 mPa·s at 25° C.;
(B) an organopolysiloxane containing at least 2 or 3 silicon-bonded hydrogen atoms per molecule,
(C) at least one hydrosilylation catalyst,
(D) at least one reinforcing and optionally one or more non-reinforcing fillers; and
(E) an adhesion promoter
(F) an oligomer of the formula

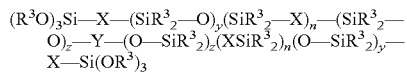

wherein
Y is $-SiR^1_2-$, $-SiR^1R^2-$ or $-Si\ R^3R^1-O-R^3R^1Si-$
each $R^3$ may be the same or different and is an alkyl group having 1 to 6 carbons;
each X may be the same or different and is an alkylene group having from 1 to 6 carbons;
each $R^1$ is a phenyl group;
each $R^2$ is $-(O-Si\ R^3_2)_z(XSi\ R^3_2)_n(O-Si\ R^3_2)_y-X-Si(O\ R^3)_3$; and
y is zero or an integer up to 6, n is 0 or 1, z is 0 or 1; with the proviso that z is 0 when n is 0 and y is greater than zero.

For the avoidance of doubt the term self-adhesive composition (sometimes referred to as selective adhesive composition) herein is intended to mean that, upon cure, a composition is able to provide an adhesive bond directly on a thermoplastic or resin substrate without the need of e.g. primers or the like being applied on to the substrate surface, whilst being non-adhesive towards metallic substrates, such as molds.

Each of the one or more organopolysiloxanes (A) contain at least 2 alkenyl groups bonded to a silicon atom per molecule and has a viscosity of from 1000 mPa·s to 200,000 mPa·s at 25° C., alternatively 1000 mPa·s to 150,000 mPa·s at 25° C., alternatively 1000 mPa·s to 100,000 mPa·s at 25° C., alternatively 1000 mPa·s to 75,000 mPa·s at 25° C. using a Brookfield® rotational viscometer using Spindle (Spindle (LV-1 to LV-4) and adapting the speed (shear rate) according to the polymer viscosity and all viscosity measurements were taken at 25° C. unless otherwise indicated.

Examples of alkenyl groups include vinyl, allyl, butenyl, pentenyl, cyclohexenyl and hexenyl groups. These may be pendent or terminal or at both positions, that is, they may be present on any of the siloxy units of the organopolysiloxane (A). Component (A) comprises straight chain and/or branched organopolysiloxanes comprising multiple units of the formula (1)

$$R'_aSiO_{4-a/2} \quad (1)$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, trifluoropropyl and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Siloxy units may be described by a shorthand (abbreviated) nomenclature, namely—"M," "D," "T," and "Q", when R is usually an alkyl group unless otherwise indicated, e.g. a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of ingredient (component) (A) are polydiorganosiloxanes containing alkenyl or alkynyl groups but typically alkenyl groups at the two terminals and are represented by the general formula (I):

$$R'R''R'''SiO-(R''R'''SiO)_m-SiOR'''R''R' \quad (I)$$

In formula (I), each R' is an alkenyl or alkynyl group but typically an alkenyl group, which typically contains from 2 to 10 carbon atoms, such as vinyl, allyl, and 5-hexenyl.

R" does not contain ethylenic unsaturation. Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. R''' is R' or R" and m represents a degree of polymerization suitable for ingredient (component) (A) to have a viscosity within the range discussed below.

Typically, all R" and R''' groups contained in a compound in accordance with formula (I) are methyl groups. Alternatively, at least one R" and/or R''' group in a compound in accordance with formula (I) is methyl and the others are phenyl or 3,3,3-trifluoropropyl. This preference is based on the availability of the reactants typically used to prepare the polydiorganosiloxanes (ingredient (component) (A)) and the desired properties for the cured elastomer prepared from compositions comprising such polydiorganosiloxanes.

Particularly preferred examples of groups R" include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R" are methyl. Some R" groups may be phenyl groups or fluoro groups. In one alternative, the polydiorganosiloxanes are largely polydialkylsiloxanes and/or polydialkylalkylphenylsiloxanes having at least two alkenyl groups per molecule. In a further alternative the polydiorganosiloxanes are largely polydimethylsiloxanes having at least two alkenyl groups per molecule. They are preferably substantially linear materials, which are end-blocked with a siloxane group of the formula $R''_3SiO_{1/2}$, wherein each R" is the same or different.

The viscosity of organopolysiloxane (A) at 25° C. is typically using a Brookfield® rotational viscometer using Spindle (LV-1 to LV-4) and adapting the speed (shear rate) according to the polymer viscosity and all viscosity measurements were taken at 25° C. unless otherwise indicated.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (A) may be either a single polymer, or a combination of two or more different polymers.

The organopolysiloxane (A) is present in the composition at a level of from 5 to 95% based on the total weight of the composition, alternatively from 35 to 85% by weight, based on the total weight of the composition, alternatively from 40 to 80% by weight based on the total weight of the composition and further alternatively from 60 to 80% by weight based on the total weight of the composition.

Component (B) is a cross-linker in the form of an organopolysiloxane containing at least 2 or 3 silicon-bonded hydrogen atoms per molecule. Component (B) normally contains 3 or more silicon-bonded hydrogen atoms so that the hydrogen atoms can react with the unsaturated alkenyl or alkynyl groups of polymer (A) to form a network structure therewith and thereby cure the composition. Some or all of Component (B) may alternatively have 2 silicon bonded hydrogen atoms per molecule when polymer (A) has >2 alkenyl or alkynyl groups per molecule.

The molecular configuration of the organopolysiloxane containing at least 2 or 3 silicon-bonded hydrogen atoms per molecule (B) is not specifically restricted, and it can be a straight chain, a straight chain with some branching, cyclic or silicone resin based. While the molecular weight of this component is not specifically restricted, the viscosity is typically from 0.001 to 50 Pa·s at 25° C. relying on the cup/spindle method of ASTM D 1084 Method B, using the most appropriate spindle from the Brookfield® RV or LV range for the viscosity range, in order to obtain a good miscibility with polymer (A).

Silicon-bonded organic groups used in component (B) may be exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl group, preferable of which are methyl and phenyl groups.

The organopolysiloxane containing at least 2 or 3 silicon-bonded hydrogen atoms per molecule (B) is typically added in an amount such that the molar ratio of the total number of the silicon-bonded hydrogen atoms in component (B) to the total number of alkenyl and/or alkynyl groups in polymer (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of the organopolysiloxane containing at least 2 or 3 silicon-bonded hydrogen atoms per molecule (B) include but are not limited to:
- (a) trimethylsiloxy-terminated methylhydrogenpolysiloxane,
- (b) trimethylsiloxy-terminated polydimethylsiloxane-methylhydrogensiloxane,
- (c) dimethylhydrogensiloxy-terminated dimethylsiloxane-methylhydrogensiloxane copolymers,
- (d) dimethylsiloxane-methylhydrogensiloxane cyclic copolymers,
- (e) copolymers and/or silicon resins consisting of $(CH_3)_2HSiO_{1/2}$ units, $(CH_3)_3SiO_{1/2}$ units and $SiO_{4/2}$ units,
- (f) copolymers and/or silicone resins consisting of $(CH_3)_2HSiO_{1/2}$ units and $SiO_{4/2}$ units,
- (g) copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Alternatively, component B, the cross-linker, may be a filler, e.g., silica treated with one of the above.

Component (B) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

The organopolysiloxane cross-linker (B) is generally present in the curable silicone elastomer composition in an amount such that the ratio of the mole number of silicon-bonded hydrogen atoms of component (B) to the mole number of alkenyl groups of component (A) ranges from (0.7:1.0) to (5.0:1.0), preferably from (0.9:1.0) to (2.5:1.0), and most preferably from (0.9:1.0) to (2.0:1.0).

The silicon-bonded hydrogen (Si—H) content of component (B) is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

Typically dependent on the number of unsaturated groups in component (A) and the number of Si—H groups in component (B), component (B) will be present in an amount of from 0.1 to 40% by weight of the total composition, alternatively from 0.5 to 20%, by weight of the total composition alternatively 0.5 to 10% by weight of the total composition, further alternatively from 1% to 5% by weight of the total composition.

Component (C) is at least one hydrosilylation (addition) reaction catalyst. These are usually selected from catalysts of the platinum metal group (platinum, ruthenium, osmium, rhodium, iridium and palladium), or a compound of one or more of such metals. Platinum and rhodium compounds are preferred due to the high activity level of these catalysts in hydrosilylation reactions. Component (C) catalyses the reaction between the unsaturated group e.g. alkenyl e.g. vinyl groups of component (A) and the Si—H groups of component (B) resulting in a cross-linked network when the curable self-adhesive silicone rubber compositions are cured to elastomer their respective elastomers.

The catalyst (C) can be a platinum group metal, a platinum group metal deposited on a carrier, such as activated carbon, metal oxides, such as aluminum oxide or silicon dioxide, silica gel or powdered charcoal, or a compound or complex of a platinum group metal.

Examples of preferred hydrosilylation catalysts (C) are platinum based catalysts, for example, platinum black, platinum oxide (Adams catalyst), platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2 \cdot (olefin)_2$ and $H(PtCl_3 \cdot olefin)$, preference being given in this context to the use of alkenes having 2 to 8 carbon atoms, such as ethylene, propylene, isomers of butene and of octene, or cycloalkanes having 5 to 7 carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as symdivinyltetramethyldisiloxane.

Hence, specific examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene or a siloxane may be used. These are described in U.S. Pat. Nos. 3,715,334 and 3,814,730.

The hydrosilylation catalyst (C) of the hydrosilylation curable silicone elastomer composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (C) can be used to tailor reaction rate and cure kinetics. The catalytic amount of the hydrosilylation catalyst (C) is generally between 0.01 ppm, and 10,000 parts by weight of platinum-group metal, per million parts (ppm), based on the weight of the composition polymer (A) and filler (D); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

Component (D) is one or more finely divided, reinforcing fillers optionally in combination with one or more non-reinforcing fillers.

The reinforcing fillers of component (D) may be exemplified by finely divided fumed silica and/or a finely divided precipitated silica, colloidal silicas and/or suitable silicone resins.

Precipitated silica fumed silica and/or colloidal silicas are particularly preferred because of their relatively high surface area, which is typically at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 300 $m^2/g$ (BET method in accordance with ISO 9277: 2010), are typically used. All these types of silica are commercially available.

When reinforcing filler (D) is naturally hydrophilic (e.g., untreated silica fillers), it is typically treated with a treating agent to render it hydrophobic. These surface modified reinforcing fillers (D) do not clump and can be homogeneously incorporated into polydiorganosiloxane polymer (A), described below, as the surface treatment makes the fillers easily wetted by polydiorganosiloxane polymer (A).

Typically reinforcing filler (D) may be surface treated with any low molecular weight organosilicon compounds disclosed in the art applicable to prevent creping of organosiloxane compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients (components). Specific examples include, but are not restricted to, silanol terminated trifluoropropylmethylsiloxane, silanol terminated vinyl methyl (ViMe) siloxane, silanol terminated methyl phenyl (MePh) siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl)disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane. A small amount of water can be added together with the silica treating agent(s) as processing aid.

The surface treatment may be undertaken prior to introduction in the composition or in situ (i.e., in the presence of at least a portion of the other ingredients (components) of the composition herein by blending these ingredients (components) together at room temperature or above until the filler is completely treated. Typically, untreated reinforcing filler (D) is treated in situ with a treating agent in the presence of polydiorganosiloxane polymer (A) which results in the preparation of a silicone rubber base material which can subsequently be mixed with other ingredients (components).

Reinforcing filler (D) is present in an amount of from 5.0 to 40 wt. % of the solids content of the composition, alternatively of from 7.5 to 35 wt. % of the solids content of the composition, alternatively of from 10.0 to 35 wt. % based on the weight % of the solids content of the composition. Hence, the amount of reinforcing filler (D) e.g., finely divided silica and/or silicone resins herein may therefore be for example, from 2.0 to 20 wt. % of the total composition, alternatively of from 2.5 to 15 wt. % of the total composition. In some instances, the amount of reinforcing filler may be of from 5.0 to 15 wt. % based on the weight of the total composition.

Non-reinforcing fillers may optionally be included in component (D) herein. These may include, for the sake of example, crushed quartz, diatomaceous earths, barium sulphate, iron oxide, titanium dioxide and carbon black, talc, wollastonite, aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Other non-reinforcing fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3·2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and, aluminium oxide.

Component (E) of the composition as described herein is an adhesion promoter Any suitable adhesion promoter(s) may be utilised. These may comprise or consist of diacrylates, triacrylates, tetraacrylates, pentaacrylates and hexaacrylates; one or more alkoxysilanes containing methacrylic groups or acrylic groups and/or one or more alkoxysilanes containing epoxy groups and optionally one or more condensation catalyst which, when present, is used to activate and/or accelerate the reaction of the adhesion promoter (E). Examples may include for diacrylates such as $C_{4-20}$ alkanediol diacrylate such as hexanediol diacrylate, heptanediol diacrylate, octanediol diacrylate, nonanediol diacrylate, and or undecanediol diacrylate; trimethylolpropane triacrylate, di(trimethylolpropane)tetraacrylate, and/or pentaerythritol tetraacrylate.

Examples of alkoxysilanes containing methacrylic groups or acrylic groups such as methacryloxymethyl-trimethoxysilane, 3-methacryloxypropyl-trimethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethylmethoxysilane, 3-acryloxypropyl-triethoxysilane, or a similar acryloxy-substituted alkyl-containing alkoxysilane.

Alternatively, or additionally the adhesion promoter (E) may be selected from compounds represented by the following general formulae 2, 3, 4 and/or 5:

Formula 2
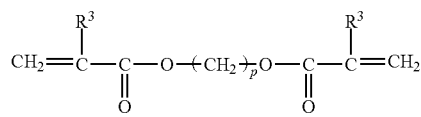

Formula 3
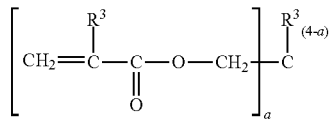

Formula 4
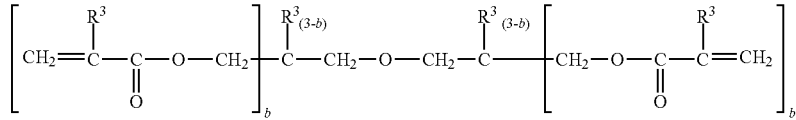

Formula 5
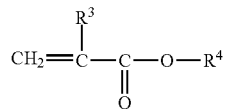

wherein, each $R^3$ in formulas 2, 3, 4 or 5 is independently a hydrogen atom or a methyl group; $R^4$ in formulas 2, 3, 4 or 5 is an aralkyl group with 7 to 20 carbons, a phenoxyalkyl group, or a phenoxyhydroxyalkyl group; "a" is an integer of 1 to 4; each "b" is independently an integer of 1 to 3; and "p" is an integer of 4 to 12.

Examples of epoxy-containing alkoxysilanes which may be used as adhesion promoter (E) may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Adhesion catalysts, i.e. condensation catalysts used to activate and/or accelerate the reaction of the adhesion promoter (e) described above may also be utilised. Such condensation catalysts may be selected from organometallic catalysts comprising titanates, e.g. Tetrapropoxy titanate; zirconates, organo aluminium chelates, titanium chelates and/or zirconium chelates.

For example, titanate and zirconate based catalysts may comprise a compound according to the general formula $Ti[OR^5]_4$ or $Zr[OR^5]_4$ where each $R^5$ may be the same or different and represents a monovalent, primary, secondary or tertiary aliphatic hydrocarbon group which may be linear or branched containing from 1 to 20 carbon atoms, alternatively 1 to 10 carbon atoms. Optionally the titanate or zirconate may contain partially unsaturated groups. Preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl.

Specific examples include but are not restricted to zirconium tetrapropylate and zirconium tetrabutyrate, tetra-isopropyl zirconate, zirconium (IV) tetra(acetyl acetonate), (sometimes referred to as zirconium AcAc), zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), zirconium tributoxyacetylacetate, zirconium butoxyacetylacetonate bisethylacetoacetate, zirconium butoxyacetylacetonate bisethylacetoacetate, diisopropoxy bis (2,2,6,6-tetramethyl-heptanethionate) zirconium, or similar zirconium complexes having β-diketones (including alkyl-substituted and fluoro-substituted forms thereof) which are used as ligands. Titanate equivalents of the above zirconates are also included.

Suitable aluminium-based condensation catalysts may include one or more of $Al(OC_3H_7)_3$, $Al(OC_3H_7)_2(C_3COCH_2COC_{12}H_{25})$, $Al(OC_3H_7)_2(OCOCH_3)$, and $Al(OC_3H_7)_2(OCOC_{12}H_{25})$.

If deemed necessary and/or beneficial, any other suitable adhesion promoter may be included in the composition. These may include other silane coupling agents, organic compounds containing two or more acrylate groups and/or reactive siloxanes and may be utilised in the absence of the foregoing or in addition to the previously described adhesion promoters if required.

Examples of adhesion promoters include silane coupling agents, such as methyltrimethoxysilane, vinyltrimethoxysilane, allyltrimethoxysilane, 1,6-bis(trimethylsilyl)hexane, 3-methacryloxypropyltrimethoxysilane and/or glycidoxypropyltrimethoxysilane.

Examples of organic compounds containing two or more acrylate groups include, e.g. diacrylates such as $C_{4-20}$ alkanediol diacrylate such as hexanediol diacrylate heptanediol diacrylate octanediol diacrylate nonanediol diacrylate and or undecanediol; diacrylate; trimethylolpropane triacrylate, di(trimethylolpropane)tetraacrylate, and/or pentaerythritol tetraacrylate.

Examples of the reactive siloxanes include siloxanes such as hydroxy-terminated dimethyl-methylvinyl siloxane trimethylsiloxy-terminated methylhydrogen siloxane in each case optionally containing one or more phenyl groups and/or perfluoroalkyl chains, such as trifluoropropyl or perfluorobutylethyl side chains. Typically, such siloxanes have a viscosity of from 0.001 to 0.1 Pa·s at 25° C., alternatively of from 0.001 to 0.05 Pa·s at 25° C.

The one or more adhesion promoter(s) is/are typically present in the composition in a total amount of from about 0.1 to 6 wt. % of the composition; alternatively, 0.1 to 4 wt. % of the composition.

As previously indicated component (F) as hereinbefore described is an oligomer of the formula

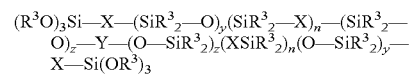

wherein
Y is $—SiR^1_2—$, $—SiR^1R^2—$ or $—Si\ R^3R^1—O—R^3R^1Si—$
each $R^3$ may be the same or different and is an alkyl group having 1 to 6 carbons;
each X may be the same or different and is an alkylene group having from 1 to 6 carbons;
each $R^1$ is a phenyl group;
each $R^2$ is $—(O—Si\ R^3_2)_z(XSi\ R^3_2)_n(O—Si\ R^3_2)_y—X—Si(O\ R^3)_3$; and
y is zero or an integer up to 6, n is 0 or 1, z is 0 or 1;
with the proviso that z is 0 when n is 0 and y is greater than zero.

Each $R^3$ may be the same or different and is an alkyl group having 1 to 6 carbons; alternatively each $R^3$ may be the same or different and selected from methyl, ethyl, propyl, n-butyl, t-butyl; alternatively each $R^3$ may be the same or different and is selected from methyl and/or ethyl.

Each X may be the same or different and is an alkylene group having from 1 to 6 carbons such as an ethylene group $(—(CH_2)_2—)$, a propylene group $(—(CH_2)_3—)$, or an n-butylene group $(—(CH_2)_4—)$ or a hexylene group $(—(CH_2)_6—)$. X is preferably a linear alkylene group but may contain branching.

Each $R^1$ is a phenyl group; the phenyl group is preferably unsubstituted but may comprising substituted groups (as defined above) if desired.

When Y is $—Si\ R^3R^1—O—R^3R^1Si—$:
If y=n=z=0 then oligomer (F) may be

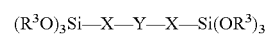

i.e. for example, $(MeO)_3—Si—(CH_2)_2—SiPhMe-O—SiPhMe-(CH_2)_2—Si(OMe)_3$
If y=1 n=1 and z=0 then oligomer (F) may be

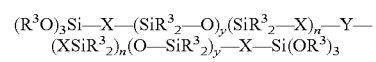

i.e. for example,

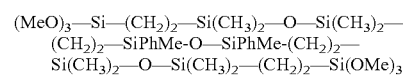

When Y is $—SiR^1_2—$:
If y=1 n=1 and z=1 then oligomer (F) may be

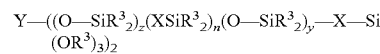

i.e. for example,

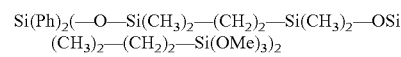

If y=1 n=0 and z=0 then oligomer (F) may be

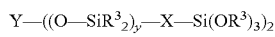

i.e. for example,

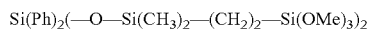

If y=n=z=0 then oligomer (F) may be

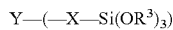

i.e. for example,

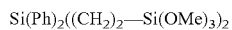

When Y is —$SiR^1R^2$—:
If y=1 n=1 and z=1 then oligomer (F) may be

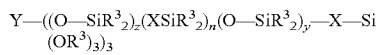

i.e. for example, $Si(Ph)\text{-}(O\text{—}Si(CH_3)_2\text{—}(CH_2)_2\text{—}Si(CH_3)_2\text{—}OSi(CH_3)_2\text{—}(CH_2)_2\text{—}Si(OMe)_3)_3$ If y=1 n=0 and z=0 then oligomer (F) may be

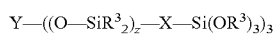

i.e. for example,

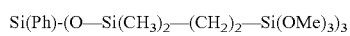

If y=0 n=z=0 then oligomer (F) may be
Y—(X—$Si(OR^3)_3)_3$
i.e. for example,
$Si(Ph)\text{-}((CH_2)_2\text{—}Si(OMe)_3)_3$. In one embodiment component (F) is

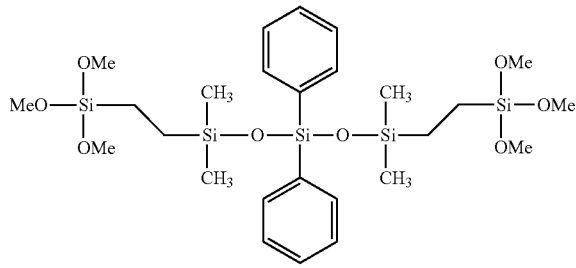

where Me is a methyl group.

Typically, when components (A) to (E) and any optional additives make up 100 wt. % of the composition excluding component (F), component (F) is added to said composition in an amount of from 0.5 to 5% by weight of the total composition of the other ingredients (components).

Optional additives may be present in the composition depending on the intended use of the curable silicone elastomer composition. Examples include one or more cure inhibitors, a dimethylvinyl polydiorganosiloxane having a viscosity of from 10 to 750 mPa·s at 25° C., mold releasing agents, adhesion catalysts, peroxides and/or pigments. Other additives might include electrically conductive fillers, thermally conductive fillers, pot life extenders, flame retardants, lubricants, mold release agents, UV light stabilizers, bactericides, wetting agents, heat stabilizers, compression set additives and plasticizers or the like.

Cure inhibitors are used, when required, to prevent or delay the addition-reaction curing process especially during storage. The optional Addition-reaction inhibitors of platinum based catalysts are well known in the art and include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known hydrosilylation reaction inhibitor includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When present, inhibitor concentrations as low as 1 mole of inhibitor per mole of the metal of catalyst will in some instances impart satisfactory storage stability and cure rate. In other instances, inhibitor concentrations of up to 500 moles of inhibitor per mole of the metal of catalyst are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

There may also be a dimethylvinyl polydiorganosiloxane having a viscosity of from 10 to 750 mPa·s at 25° C. present. Such dimethylvinyl polydiorganosiloxane typically have an analogous structure to component A, with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) polymers of this type have a viscosity of from 10 to 750 mPa·s at 25° C.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, iron oxide magnesium oxide, and aluminium oxide), graphite, diamond, and mixtures or derivatives thereof.

Examples of chain extender include straight chain organopolysiloxanes containing 2 silicon-bonded hydrogen groups on the terminal position. Such chain extender is different from component (B) the cross-linker in the form of an organopolysiloxane containing at least 2 or 3 silicon-bonded hydrogen atoms per molecule.

Examples of flame retardants include aluminium trihydrate, chlorinated paraffins, hexabromocyclododecane, triphenyl phosphate, dimethyl methylphosphonate, tris(2,3- dibromopropyl) phosphate (brominated tris) melamine cyanurate and melamine (poly)phosphate, and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity <150 mPa·s at 25° C. When present such silicone fluid may be present in the curable silicone elastomer composition in an amount ranging of from 0.1 to 5% weight, based on the total weight of the composition.

The curable self-adhesive silicone rubber compositions may comprise:

a self-adhesive curable silicone elastomer composition that can achieve significant adhesion on a thermoplastic substrate, on an organic resin substrate or on a thermoplastic and organic resin substrate surface which comprises:

Component (A) one or more organopolysiloxanes containing at least 2 alkenyl groups and/or alkynyl groups, preferably alkenyl groups per molecule and having a viscosity in a range of 1000 mPa·s to 200,000 mPa·s at 25° C., in an amount of from 5 to 95% based on the total weight of the composition, alternatively from 35 to 85% by weight, based on the total weight of the composition, alternatively from 40 to 80% by weight based on the total weight of the composition and further alternatively from 50 to 80% by weight based on the total weight of the composition;

Component (B), an organopolysiloxane containing at least 2 or 3 silicon-bonded hydrogen atoms per molecule, in an amount of 0.1-40% weight of the total composition, alternatively from 0.5 to 20%, by weight of the total composition alternatively 0.5 to 10% by weight of the total composition, further alternatively from 1% to 5% by weight of the total composition;

Component (C), at least one hydrosilylation catalyst, in an amount of 0.01-10% by weight of the total composition, alternatively 0.01% to 5% by weight of the total composition, further alternatively from 0.05% to 2% by weight of the total composition;

Component (D), at least one reinforcing and optionally one or more non-reinforcing fillers in an amount of from 1 to 80% by weight, based on the total weight of the composition, alternatively from 1 to 50% by weight, based on the total weight of the composition, alternatively 5 to 50% by weight, based on the total weight of the composition, further alternatively from 8 to 30% by weight, based on the total weight of the composition;

Component (E) an adhesion promoter in an amount of about 0.1 to 6 wt. % of the composition; alternatively, 0.1 to 4 wt. % of the composition;

This disclosure is intended to include any of the above combinations providing the total % composition of components (A) to (E) and any optional additives make up 100 wt. % by weight of the composition. The composition above excludes component (F), is 100% by weight.

As previously discussed Component (F) is introduced into the composition of all other ingredients (components) in an amount of from 0.5 to 5% by weight of the total composition of the other ingredients and is:

an oligomer of the formula

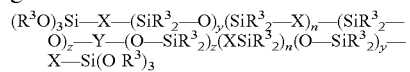

wherein

Y is —SiR$^1_2$—, —SiR$^1$R$^2$— or —Si R$^3$R$^1$—O—R$^3$R$^1$Si— each R$^3$ may be the same or different and is an alkyl group having 1 to 6 carbons;

each X may be the same or different and is an alkylene group having from 1 to 6 carbons;

each R$^1$ is a phenyl group;

each R$^2$ is —(O—Si R$^3_2$)$_z$(XSi R$^3_2$)$_n$(O—Si R$^3_2$)$_y$—X—Si(O R$^3$)$_3$; and y is zero or an integer up to 6, n is 0 or 1, z is 0 or 1; with the proviso that z is 0 when n is 0 and y is greater than zero.

The self-adhesive curable silicone elastomer composition as hereinbefore described may be stored before use in two or more parts. In the case of a two-part composition, i.e. having part (A) and part (B):

Part (A) typically contains the catalyst (C) in addition to organopolysiloxane (A) and filler (D), and Part (B) usually includes components (B), and when present inhibitor as well as one of the organopolysiloxane (A) or the filler (D).

Component (E) may be present in either or both part (A) or part (B).

It is important for the catalyst (C) to be stored separately from cross-linker (B) to prevent premature cure during storage. Component (E) may be present in either or both part (A) or part (B) providing it is not detrimental in any way to the other ingredients (components) present.

Component (F) and any optional additives (excluding the inhibitor) may be in either part (A) or part (B) or in both parts. They may also be added into the final mixture after parts (A) or part (B) have been combined.

In one embodiment, there is provided a process for preparing an article or a composite part of an article comprising a) forming a mixture of the self-adhesive curable silicone elastomer composition described herein, and b) applying the mixture onto a surface of a substrate;

c) curing the mixture at a temperature of from 80 to 250° C.

In step (a) when the composition is stored in multiple parts before use, the different parts are combined together and homogeneously mixed, with the optional subsequent step of the addition of any additional additive as may be required by the final use of the composition.

The substrate may be any suitable thermoplastic or organic resin substrates Examples of substrates include acrylonitrile-butadiene-styrene, polyphenylene/styrene blends, polystyrenes, polycarbonates (PC), polyurethane, styrene resin, polyethylene, polypropylene, acrylic, polyacrylates, polymethacrylates, polyacrylamides, polyesters, polyethylene terephthalate, polybutylene terephthalate (PBT), polyphenylene oxide, polyphenylene sulfide, polysulfone, nylon, polyamide (PA), polyimide, fluoropolymers, and liquid crystal resin, non-resin containing polyetherimides; phenolic resins, epoxy resins, urea resins, melamine resins, alkyd resins, and derivatives of all those organic resins. Any of the above may be activated if desired, e.g. plasma, corona or UV-C activated.

The homogeneous mixing of the components of the present curable self-adhesive silicone rubber composition may be undertaken by using a suitable mixing means such as a kneader mixer, a Z-blade mixer, a two roll mill (open mill), a three roll mill, a Haake® Rheomix OS Lab mixer, a screw extruder or a twin-screw extruder or the like. Speed mixers as sold by e.g. Hauschild and as DC 150.1 FV, DAC 400 FVZ or DAC 600 FVZ, may alternatively be used.

The curable self-adhesive silicone rubber compositions may be processed (or cured) by injection moulding, press moulding, extrusion moulding, transfer moulding, press vulcanization, calendaring.

Curing can for example take place in a mold to form a moulded silicone article adhered to an e.g. polycarbonate substrate. The curable self-adhesive silicone rubber composition may for example be injection moulded to form an article adhered to the polycarbonate material, or the composition can be overmoulded by injection moulding around thermoplastic substrates, organic resin substrates or thermoplastic and organic resin substrates or articles or over a thermoplastic substrate, organic resin substrate or thermoplastic and organic resin substrate. When cured in presence of a heat sensitive substrate, the curable self-adhesive silicone rubber composition as hereinbefore described is cured under such conditions enabling development of mechanical adhesion with the heat sensitive substrate and the like, and more specifically, by using a temperature and curing time at which the heat sensitive substrate is not deformed, melted, or denatured.

The curable self-adhesive silicone rubber composition may be cured into silicone elastomer articles which are adhered to thermoplastic substrates, organic resin substrates or thermoplastic and organic resin substrates, for example, tubes, strips, solid cord or custom profiles according to the size specifications of the manufacturer.

The curable self-adhesive silicone rubber composition as hereinbefore described may be applied to the surface of the substrate by any suitable means such as rolling, spreading, 3-D printing and the like, and cured as described above. In the case of using a 3D printing method. A typical method of forming a three-dimensional (3D) article may comprise multiple steps. For example, the method may comprise (i) printing a first heat-curable silicone composition with a 3D printer to form a layer. The method may further comprise (ii) heating the layer to form an at least partially cured layer. In addition, the method may comprise (iii) printing a second heat-curable silicone composition on the at least partially cured layer with the 3D printer to form a subsequent layer. The method may also comprise (iv) heating the subsequent layer to form an at least partially cured subsequent layer. Optionally, steps iii) and iv) may be repeated with independently selected curable silicone composition(s) for any additional layer(s) to form the 3D article. A method of forming a three-dimensional (3D) article, said method comprising:
  i. printing a first heat-curable silicone composition in accordance with the composition as hereinbefore described with a 3D printer to form a layer;
  ii. heating the layer to form an at least partially cured layer;
  iii. printing a second heat-curable silicone composition on the at least partially cured layer with the 3D printer to form a subsequent layer;
  iv. heating the subsequent layer to form an at least partially cured subsequent layer; and,
  v. optionally, repeating steps iii) and iv) with independently selected heat-curable silicone composition(s) for any additional layer(s) to form the 3D article.

The layer may be on top of a thermoplastic or resin substrate.

After application of the curable self-adhesive silicone rubber composition onto the substrate, the composition is cured at the cure temperature ranging between 80° C. and 250° C. Such temperatures are generally determined by the materials involved.

Key advantages regarding the curable self-adhesive silicone rubber composition as hereinbefore described are:
  Heat-humidity stabilization of adhesion (not only initial adhesion)
  Broad application range (works on polybutylene terephthalate (PBT), polycarbonate, polyamide)
  Does not impact cure and physical properties In one embodiment herein there is provided an article consisting of a silicone elastomer cured from self-adhesive curable silicone elastomer composition as hereinbefore described or consisting of a silicone elastomer cured from self-adhesive curable silicone elastomer composition on a rigid or flexible substrate such as the type described above.

In another embodiment there is provided a composite part comprising a silicone elastomer cured from the curable self-adhesive silicone rubber composition as hereinbefore described as described above on a rigid or flexible substrate. It is to be understood that such composite parts include those constructions where any of a substrate and a silicone elastomer are used as an integral component in an article. Examples of substrates as described above.

In one embodiment, there is provided an article or composite part comprising an elastomeric material generated from the self-adhesive curable silicone rubber composition above adhered to a thermoplastic substrate, organic resin substrate or thermoplastic and organic resin substrate such as described above.

In another embodiment the curable self-adhesive silicone rubber composition as hereinbefore described may be applied to the surface of the substrate be processed using a 3D printing method. A typical method of forming a three-dimensional (3D) article may comprise multiple steps. For example, the method may comprise (i) providing a thermoplastic substrate, organic resin substrate or thermoplastic and organic resin substrate. The method may further comprise (ii) heating the substrate. In addition, the method may comprise (iii) printing a curable self-adhesive silicone rubber composition as hereinbefore described on the substrate with a 3D printer to form a subsequent layer. Optionally, the latter step may be repeated if required to apply one or more further layers.

Examples of such articles or composite parts, in the case of all of the above can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. Electronic applications may include mobile phone cover seals, mobile phone accessories, precision electronic equipment, electrical switches and switch covers, watches and wristbands, wearable apparatus, e.g. facemasks, wearable electronic devices, and the like.

A composite part may also be selected from parts of mobile phones, mobile telecommunications equipment, gaming machines, clocks, image receivers, DVD equipment, mobile device, media device and mini-disk (MD) equipment, CD equipment, and other precision electronic equipment, microwave ovens, refrigerators, electric rice cookers, TVs, thin displays of liquid crystal TVs and plasma TVs, various home appliance, copying machines, printers, facsimile machines, and other office automation (GA) equipment, connector seals, spark plug caps, components of various sensors, and other automobile components.

EXAMPLES

In the following examples all viscosities were measured using a Brookfield® rotational viscometer using Spindle (LV 1 to LV-4) or (RV-7) and adapting the speed (shear rate) according to the polymer viscosity. Two different 2-pa liquid silicone rubber (LSR) compositions were utilised as the basis for the examples. One of the LSR compositions was a self-adhesive curable silicone rubber "composition designed to able to adhere during cure to substrates made from thermoplastic materials, organic resin based materials or both thermoplastic materials and organic resin based materials with which they are placed in direct contact prior to or during the cure process but which remain non-adhesive towards metallic substrates such as molds and is referred to as the A-comp. The second composition is non-adhesive to said thermoplastic materials and is referred to as the N-comp.

The A-comp and N-comp compositions are provided in Tables 1a and 1b below. In use the part A and part B compositions were mixed on a 1:1 basis by weight.

TABLE 1a

Self-Adhesive composition (A-Comp) used in Examples

| Ingredients | A-Comp Part A | A-Comp Part B |
|---|---|---|
| Masterbatch 1 | 90.29 | 4.50 |
| Masterbatch 2 | | 80.39 |
| vinyldimethyl terminated polydimethylsiloxane having a viscosity of 53,000 mPa · s at 25° C. | 3.00 | 6.38 |
| Vinyl terminal poly(dimethylsiloxane-co-methylvinylsiloxane) having a viscosity of 370 mPa · s at 25° C. | 4.76 | 5.44 |
| Karstedt catalyst | 0.005 | |
| Phenyltris(dimethylsiloxy)silane | | 1.00 |
| trimethyl terminated polymethylhydrogen dimethylsiloxane having a viscosity of 30 mPa · s at 25° C. | | 1.70 |

TABLE 1a-continued

Self-Adhesive composition (A-Comp) used in Examples

| Ingredients | A-Comp Part A | A-Comp Part B |
|---|---|---|
| hydroxydimethyl terminated polydimethylsiloxane having viscosity of approximately 21 mPa · s | 0.60 | 0.60 |
| ethynyl cyclohexanol (ETCH) | | 0.08 |
| Di(trimethylolpropane)tetraacrylate | 1 | |
| | 100.00 | 100.00 |

TABLE 1b

Non-Adhesive Composition (N-Comp) used in Examples

| Ingredients | N-Comp Part A | N-Comp Part B |
|---|---|---|
| Masterbatch 1 | 90.29 | 4.50 |
| Masterbatch 2 | | 80.39 |
| vinyldimethyl terminated polydimethylsiloxane having a viscosity of 53,000 mPa · s at 25° C. | 4.00 | 7.73 |
| Vinyl terminal poly(dimethylsiloxane-co-methylvinylsiloxane) having a viscosity of 370 mPa · s at 25° C. | 4.76 | 5.44 |
| Karstedt catalyst | 0.005 | |
| trimethyl terminated polymethylhydrogen dimethylsiloxane having a viscosity of 30 mPa · s at 25° C. | | 1.35 |
| hydroxydimethyl terminated polydimethylsiloxane having a viscosity of approximately 21 mPa · s | 0.60 | 0.60 |
| ethynyl cyclohexanol (ETCH) | | 0.08 |
| | 100.00 | 100.00 |

In the above compositions:
Masterbatch 1 contains 70.8 parts of a dimethylvinylsiloxy terminated polydimethylsiloxane having a viscosity of about 53,000 mPa·s at 25° C., and 22.4 parts of a fumed silica filler having a surface area of approximately 300 m$^2$/g. The silica is hydrophobized and contains no vinyl functionalization; and
Masterbatch 2 contains 66.6 parts of a dimethylvinylsiloxy terminated polydimethylsiloxane having a viscosity of about 55 Pa·s at 25° C., and 25.8 parts of a fumed silica filler having a surface area of approximately 300 m$^2$/g. The silica is hydrophobized and has a vinyl functionalization of approximately 0.178 mmol/g.

The physical properties of A-comp or N-comp compositions were analysed, either with no further additive present or after mixing with an additional additive, e.g. oligomer (F) or an alternative. The amount of additive introduced was determined by weight and was per the complete mixed composition of the A-comp composition or N-comp composition. The additive may be introduced into the part A composition, the part B composition or alternatively may be added into the final mixture after the part A composition and the part B composition have been mixed together.

TABLE 1c

| | C1 | C2 | EX1 | C3 | C4 | C5 | C6 |
|---|---|---|---|---|---|---|---|
| LSR type | A-Comp | N-Comp | A-Comp | N-Comp | N-Comp | A-Comp | A-Comp |
| Additive type | — | — | (F) | (F) | (F) | Add-1 | Add-2 |
| wt. % added | — | — | 1 | 1 | 2 | 0.52 | 0.36 |
| mmol added | — | — | 1.59 | 1.59 | 3.18 | 1.59 | 1.59 |

Wherein (F) is,

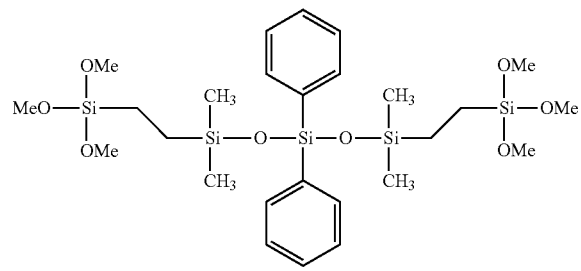 [SMILES: CO[Si](CC[Si](C)(C)O[Si](O[Si](C)(C)CC[Si](OC)(OC)OC)(c1ccccc1)c1ccccc1)(OC)OC]

Add-1 is 1,6-bis(trimethylsilyl)hexane and
Add-2 is 1,6-hexanediol diacrylate (HDDA)

The resulting compositions were Cure parameters were tested using a Premier MDR from Alpha Technologies. Test parameter 10 min 120° C.

Table 2a shows the point in cure time when 2% (TC2), 10% (TC10), 60% (TC60), or 90% (TC90) of cure occurred.

TABLE 2a

| MDR-measurement Cure Parameters (10 min @ 120° C.) | | | | | | | |
|---|---|---|---|---|---|---|---|
|  | C1 | C2 | EX1 | C3 | C4 | C5 | C6 |
| TC2 (s) | 34 | 24 | 38 | 36 | 33 | 36 | 38 |
| TC10 (s) | 41 | 35 | 43 | 40 | 37 | 42 | 55 |
| TC60 (s) | 59 | 44 | 56 | 52 | 46 | 56 | 94 |
| TC90 (s) | 91 | 61 | 77 | 75 | 63 | 81 | 162 |

Samples were tested for initial adhesion and after 7 days at 85° C. and 85% relative humidity to provide an indication of long-term heat-humidity stability to assess if the peel (adhesive) strength is maintained after aging. Adhesion was tested in a 900 "floating roller peel test" using a floating roller device designed for e.g. DIN EN 1372 ("Adhesives—Test method for adhesives for floor and wall coverings").

Three commercially available thermoplastic substrate materials were used as indicated in Table 2 b below. They were Ultradur® B 4300 G4 polybutylene terephthalate (PBT) from BASF
Ultramid® A3EG6 polyamide (PA) from BASF; and
LEXAN™ Resin 121 polycarbonate (PC) from SABIC.

The thermoplastic substrates had the dimensions: 25 mm×100 mm (3 mm thickness) and were cleaned with isopropanol and dried according to the following conditions:
PBT: 18 hours at 120° C.
PA-66:18 hours at 80° C.
PC: 18 hours at 120° C.

The thermoplastic substrates were preheated at 120° C. for 5 min prior to overmolding with LSR. Substrates were overmolded with 3 mm layer of LSR. compression molded at 300 bar (30 MPa) for 120° C. and cured for 5 min cure.

The resulting specimen were stored for ~hours before performing the tests. The peel adhesion testing was carried out using floating roller peel test, at test speed of 300 mm per minute and the average force during the peel experiment was recorded (in N/mm).

Heat ageing is done in a standard ventilated oven. The heat humidity tests are Run in a Simulationsanlage Messtechnik WK3-340/70 by Weiss Umwelttechnik GmbH climate chamber.

TABLE 2b

| ADHESION (initial and after 1 week 85° C./85% relative humidity) | | | | | | | |
|---|---|---|---|---|---|---|---|
|  | C1 | C2 | EX1 | C3 | C4 | C5 | C6 |
| initial PBT (N/25 m) | 56 | 5 | 51 | 4 | 0 | 27 | 16 |
| 85/85 PBT @ 7 days (N/25 m) | 7 | 0 | 47 | 0 | 0 | 17 | 6 |
| initial PA (N/25 m) | 33 | 0 | 60 | 0 | 0 | 23 | 0 |
| 85/85 PA @ 7 days (N/25 m) | 2 | 0 | 33 | 0 | 0 | 29 | 0 |
| initial PC (N/25 m) | 99 | 0 | 74 | 0 | 0 | 90 | 69 |
| 85/85 PC @ 7 days (N/25 m) | 13 | 0 | 50 | 0 | 0 | 29 | 20 |

Samples were obtained by press cure for 10 min at 120° C., at 300 bar (30 MPa). Sample thickness 2 mm. Physical properties of cured test pieces for each composition identified in Tables 1a-1c were obtained. Shore A hardness was measured following test ISO 7619-1:2010 Rubber, vulcanised or thermoplastic—Determination of indentation hardness—Part 1: Durometer method (Shore hardness) (ASTM D2240-97). The tensile strength and elongation results were obtained via ISO 37:2011 Rubber, vulcanised or thermoplastic—Determination of tensile stress-strain properties (ASTM D412-98A).

TABLE 2c

| Physical Properties (cure condition: 10 min at 120° C.) | | | | | | | |
|---|---|---|---|---|---|---|---|
|  | C1 | C2 | EX1 | C3 | C4 | C5 | C6 |
| Shore A Hardness | 33 | 41 | 30 | 40 | 39 | 30 | 40 |
| Tensile Strength (MPa) | 6.4 | 7.2 | 6.2 | 6.9 | 6.8 | 6.3 | 8.6 |
| Elongation (%) | 634 | 481 | 668 | 476 | 483 | 677 | 757 |

The final compositions in the examples depicted in Table 1c and the resulting elastomers cured therefrom were chosen for the following reasons:
C1: self-adhesive composition with good initial adhesion, but poor heat-humidity stability;
C2: non-adhesive reference composition. No adhesion;
Ex1: self-adhesive composition containing oligomer (F) with good initial adhesion, and good heat-humidity stability. Furthermore, it will be appreciated that the addition of the oligomer (F) had minimal effect on physical properties and cure rates;
C3: non-adhesive composition which despite containing 1% by weight oligomer (F) additive had no adhesion. It was considered surprising that oligomer (F) did not act as an adhesion promoter;
C4: non adhesive composition with 2% of oligomer (F). It was even more surprising that despite increasing the amount of oligomer (F) present even at higher loadings no adhesion was apparent in the presence of oligomer (F);
C5: In C5 the oligomer (F) was replaced by equimolar amounts of a known adhesion promoter for these systems, 1,6-bis(trimethylsilyl)hexane. The results showed poor adhesion and poor heat-humidity stability in the presence of 1,6-bis(trimethylsilyl)hexane which it was surmised indicated that the phenyl presence on oligomer (F) appeared to be a critical element; and
C6: C6 shows that adding acrylate adhesion promoter in equimolar amounts as oligomer (F) does not improve adhesion. Furthermore, C6 shows that cure and mechanics are significantly impacted. In contrast addition of oligomer (F) does not have any impact as described before, which is good and an additional benefit for oligomer (F) as compared to other additives/adhesion promoters.

Hence, based on the above examples the addition of oligomer (F) into liquid silicone rubber compositions provides the user with three key advantages:
Heat-humidity stabilization of adhesion (not only initial adhesion)
Broad application range (works on PBT, polycarbonate, polyamide)
Does not impact cure and physical properties.

The invention claimed is:

1. A self-adhesive curable silicone elastomer composition that can achieve adhesion on plastic/thermoplastic/resin material substrates, the self-adhesive curable silicone elastomer composition comprising:
   (A) one or more organopolysiloxanes containing at least 2 alkenyl groups and/or alkynyl groups per molecule and having a viscosity in a range of 1,000 to 200,000 mPa·s at 25° C.;
   (B) an organopolysiloxane containing at least 2 or 3 silicon-bonded hydrogen atoms per molecule;
   (C) at least one hydrosilylation catalyst;
   (D) at least one reinforcing filler and optionally one or more non-reinforcing fillers;
   (E) an adhesion promoter; and
   (F) an oligomer of the formula;

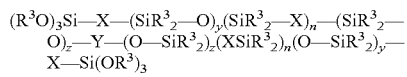

wherein
   Y is —SiR$^1$$_2$—, —SiR$^1$R$^2$— or —SiR$^3$R$^1$—O—R$^3$R$^1$Si—;
   each R$^3$ may be the same or different and is an alkyl group having 1 to 6 carbons;
   each X may be the same or different and is an alkylene group having from 1 to 6 carbons;
   each R$^1$ is a phenyl group;
   each R$^2$ is —(O—SiR$^3$$_2$)$_z$(XSiR$^3$$_2$)$_n$(O—SiR$^3$$_2$)$_y$—X—Si(OR$^3$)$_3$; and
   y is zero or an integer up to 6, n is 0 or 1, and z is 0 or 1;
   with the proviso that z is 0 when n is 0 and y is greater than zero.

2. The self-adhesive curable silicone elastomer composition in accordance with claim 1, wherein the adhesion promoter (E) is selected from the group of diacrylates, triacrylates, tetraacrylates, pentaacrylates, and hexaacrylates.

3. The self-adhesive curable silicone elastomer composition in accordance with claim 1, wherein the oligomer (F) is selected from:

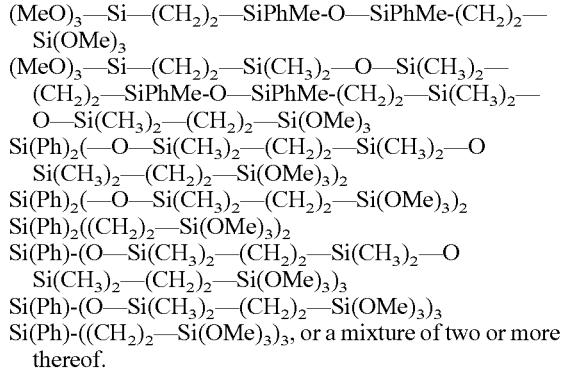

4. The self-adhesive curable silicone elastomer composition in accordance with claim 1, wherein component (F) is added to the composition in an amount of from 0.5 to 5% by weight of the total composition of the other components.

5. The self-adhesive curable silicone elastomer composition in accordance with claim 1, wherein the composition comprises a cure inhibitor.

6. The self-adhesive curable silicone elastomer composition in accordance with claim 1, stored before use in at least 2 separate parts.

7. A process for preparing an article or a composite part of an article, the process comprising:
   a) forming a mixture of the self-adhesive curable silicone elastomer composition according to claim 1;
   b) applying the mixture onto a surface of a substrate; and
   c) curing the mixture at a temperature of from 80 to 250° C.

8. The process in accordance with claim 7, wherein the substrate is a polycarbonate.

9. An article cured from the self-adhesive curable silicone elastomer composition according to claim 1.

10. The article in accordance with claim 9, containing silicone elastomer cured from the self-adhesive curable silicone elastomer composition adhered to a plastic substrate.

11. The article in accordance with claim 9, containing silicone elastomer cured from the self-adhesive curable silicone elastomer composition adhered to on a thermoplastic substrate, an organic resin substrate, or a thermoplastic and organic resin substrate.

12. The article in accordance with claim 9, selected from housings with a silicone seal or gasket, plugs and connectors, components of sensors, membranes, diaphragms, climate venting components, personal electronic equipment, mobile phone cover seals, mobile phone accessories, precision electronic equipment, electrical switches and switch covers, watches and wristbands, or wearable electronic devices.

13. A composite part comprising a silicone elastomer cured from the curable silicone elastomer composition according to claim 1 on a plastic/thermoplastic/resin material substrate, optionally on a polycarbonate material substrate.

14. The composite part in accordance with claim 13, selected from housings with a silicone seal or gasket, plugs and connectors, components of sensors, membranes, diaphragms, climate venting components, personal electronic equipment, mobile phone cover seals, mobile phone accessories, precision electronic equipment, electrical switches and switch covers, watches and wristbands, wearable apparatus and/or wearable electronic devices, parts of mobile phones, mobile telecommunications equipment, gaming machines, clocks, image receivers, digital video disc (DVD) equipment, mini disc (MD) equipment, compact disc (CD) equipment, microwave ovens, refrigerators, electric rice cookers, televisions (TVs), thin displays of liquid crystal TVs and plasma TVs, home appliances, copying machines, printers, facsimile machines, and other office automation (OA) equipment, connector seals, spark plug caps, and other automobile components.

15. A method of forming a three-dimensional (3D) article, the method comprising:
   i) printing a first heat-curable silicone composition with a 3D printer to form a layer;
   ii) heating the layer to form an at least partially cured layer;

iii) printing a second heat-curable silicone composition on the at least partially cured layer with the 3D printer to form a subsequent layer;
iv) heating the subsequent layer to form an at least partially cured subsequent layer; and,
v) optionally, repeating steps iii) and iv) with independently selected heat-curable silicone composition(s) for any additional layer(s) to form the 3D article;
wherein at least one of the heat-curable silicone compositions is the self-adhesive curable silicone elastomer composition according to claim 1.

* * * * *